United States Patent

[11] 3,625,963

[72] Inventors Francois Capitant
 Paris;
 Guy Lalanne, Ris-Orangis, Essonne; Albert Robin, Le Plessis-Trevise, Val-de-Marne, all of France
[21] Appl. No. 743,645
[22] Filed July 10, 1968
[45] Patented Dec. 7, 1971
[73] Assignee Rhone-Poulenc S.A.
 Paris, France
[32] Priorities July 11, 1967
[33] France
[31] 113935;
 June 7, 1968, France, No. 154193

[54] PROCESS FOR THE PREPARATION OF 3-METHANESULPHONYL-PHENTHIAZINES
 15 Claims, No Drawings
[52] U.S. Cl. .................................................. 260/243 A,
 260/243 AA, 260/243 AC

[51] Int. Cl. ............................................... C07d 93/14
[50] Field of Search ............................................ 260/243

[56] References Cited
UNITED STATES PATENTS
3,084,161 4/1963 Renz et al. ..................... 260/243

Primary Examiner—Henry R. Jiles
Assistant Examiner—Harry I. Moatz
Attorney—Stevens, Davis, Miller and Mosher ABSTRACT: 3-Methanesulphonyl-phenthiazines (Beilstein nomenclature) unsubstituted or substituted on the nitrogen atom of the phenthiazine nucleus are prepared by oxidizing the methylthio group of a corresponding 3-methylthiophenthiazine to a methanesulphonyl group, such procedure simultaneously causing oxidation of the sulfur atom in the phenthiazine nucleus, and reducing by the action of hydrogen the resultant 3-methanesulphonyl-9-oxophenthiazine to a 3-methanesulphonyl-phenthiazine.

PROCESS FOR THE PREPARATION OF 3-METHANESULPHONYL-PHENTHIAZINES

This invention relates to a new process for the preparation of 3-methanesulphonylphenthiazines (Beilstein nomenclature).

It is the object of the present invention to provide a new process for the preparation of 3-methanesulphonylphenthiazines of the general formula:

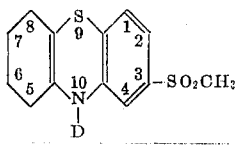

wherein D represents a hydrogen atom or a grouping known from the literature to be capable of being attached to the nitrogen atom of the phenthiazine nucleus, examples of which are given hereinafter.

Hitherto, it has been known to prepare 3-methanesulphonylphenthiazine by the cyclization of 3-methanesulphonyl-diphentylamine by means of sulfur as disclosed British Pat. No. 799,919 entitled "Improvements in or relating to Phenthiazine Derivatives" applied for by Societe des Usines Chimiques Rhone-Poulenc on 4th Apr. 1957. This process, which results in the simultaneous formation of the 1-methanesulphonylphenthiazine isomer, has been substantially abandoned in favour of the process consisting in the cyclization of a 2-halogeno-2'-amino-4(or 4')-methanesulphonyl-diphenyl sulphide by heating in an anhydrous solvent in the presence of an acid-binding agent as also disclosed in British Pat. No. 799,919. The latter process involving cyclization of diphenylsulphides can also be applied to the preparation of N-substituted 3-methanesulphonylphenthiazines as disclosed in British Pat. No. 811,959 entitled "New Phenthiazine Derivatives and their preparation" applied for by Societe des Usines Chimiques Rhone-Poulenc on 26th Mar. 1957 and in British Pat. No. 1,043,852 entitled "Improvements in or relating to Phenothiazine Compounds" applied for by Sandoz Patents Limited on 1st July 1963.

The process of the invention described hereinafter makes it possible to prepare by a particularly convenient method 3-methanesulphonylphenthiazines, whose industrial value and properties are well-known from the literature, without passing through methanesulphonyl-substituted diphenylsulphides. The new process employs 3-methylthiophenthiazines as starting materials, which are known industrial products.

As groupings known from the literature as being capable of being attached to the nitrogen atom of the phenthiazine nucleus and represented by symbol D in general formula I there may be mentioned, for example, the radicals

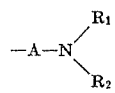

in which A represents a straight or branched-chain divalent aliphatic hydrocarbon group containing two to five carbon atoms, and $R_1$ and $R_2$ are the same or different and either each represents a lower alkyl group or one of $R_1$ and $R_2$ represents a hydrogen atom and the other represents a lower alkyl group, or $R_1$ and $R_2$ together with the nitrogen atom to which they are attached collectively represent a heterocyclic group, for example a pyrrolidino, piperidino, morpholino or 4-alkyl-piperazino group (as mentioned in British Pat. No. 811,959) or

represents a grouping of the formula:

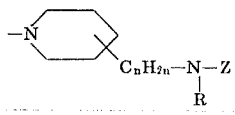

in which $n$ represents 0, 1 or 2, R represents a hydrogen atom or a lower alkyl radical, and Z represents a lower acyl, lower alkoxycarbonyl or lower alkanesulphonyl group, or a carbamoyl or sulfamoyl group (as mentioned in British Pat. No. 875,845 entitled "Improvements in or relating to Phenthiazine Derivatives" applied for by Societe des Usines Chimiques Rhone-Poulenc on 13th Apr. 1959 and in the corresponding French Pat. No. 1,261,878).

According to the present invention, 3-methanesulphonylphenthiazines of general formula I are prepared by the process which comprises oxidizing a 3-methylthiophenthiazine of the general formula:

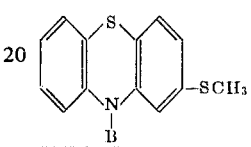

to a 3-methanesulphonyl-9-oxophenthiazine of the general formula:

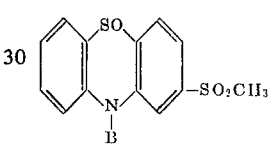

by known methods for oxidizing an organic sulphide to a sulfone, and if necessary converting by known methods the atom or group B as hereinafter defined in the 3-methanesulphonyl-9-oxophenthiazine to a grouping D as hereinbefore identified, and reducing the resulting 9-oxophenthiazine compound of the general formula:

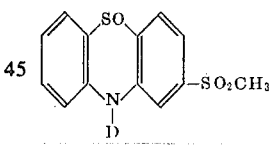

to the corresponding 3-methanesulphonylphenthiazine of formula I by known methods for reducing a sulfoxide to a sulfide without affecting a methanesulphonyl group, the symbol B representing a hydrogen atom or an organic radical which can withstand without modification the said oxidation and reduction phases such as a grouping D as hereinbefore particularly identified, or an organic radical which is modified in the said oxidation phase but restored to its initial form in the said reduction phase; or any organic radical which is or is not modified in the said oxidation phase but is capable of being replaced itself or in its oxidized form by a grouping D as hereinbefore identified by known methods. Of the said organic radicals represented by B acyl radicals are particularly preferred. By "acyl radical" is meant an acyl radical derived from an aliphatic acid containing one to four carbon atoms or a cycloalkanoic acid containing at most nine carbon atoms, preferably a cycloalkanoic acid with an aromatic nucleus.

The oxidation of the 3-methylthiophenthiazine of formula III is carried out by treating the starting material in solution in an organic solvent which is inert under the reaction conditions employed with an oxidizing agent which is soluble in the solvent.

As oxidizing agent, there is preferably employed hydrogen peroxide, an inorganic or organic peroxide, or an inorganic or organic per-salt soluble in the solvent which is used. Preferably, hydrogen peroxide is employed. It is unnecessary to use pure hydrogen peroxide, commercial hydrogen peroxide having a density of 1.1 to 1.3 being satisfactory.

As inert organic solvent, there if preferably employed an alcohol or an organic acid; methanol, ethanol, propanol, butanol or acetic acid are particularly suitable. It is preferred to use an excess of the oxidizing agent, a quantity of from 1.1 to 5 times the theoretically necessary quantity for the production of the sulphonated derivative sulphoxidized in the 9-position of formula IV, and preferably between 1.3 and 2 times the theoretically necessary quantity, being preferred.

The oxidation phase is carried out between ambient temperature and the boiling temperature of the reaction mixture. The reaction must be continued for a time sufficient to enable the methylthio radical of the starting material to be entirely converted to the methanesulphonyl radical, but stopped before a considerable quantity of a compound dioxidized in the 9-position, i.e. a 3-methanesulphonyl-9,9-dioxophenthiazine of the general formula:

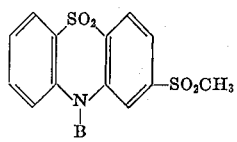

VI

B being as hereinbefore defined, is formed. For example, when 10-acetyl-3-methylthiophenthiazine is treated in ethanol with 1.8 times the theoretically necessary quantity of hydrogen peroxide of a density of 1.13 at the boiling temperature of the mixture, a reaction period of 24 hours is satisfactory.

The addition of a small quantity of a strong mineral acid, for example sulphuric acid, facilitates the reaction, but this addition is not essential.

The 3-methanesulphonyl9-oxophenthiazine of formula IV thus obtained may, if desired, be isolated by any conventional means such as cooling, concentration of the reaction medium or dilution with water followed by filtration of the solid product obtained.

When the significance of symbol B is not identical with that desired in respect of symbol D, the oxidation product of formula IV will be converted to 3-methanesulphonyl-9-oxophenthiazine and the latter converted to a product in which the symbol D has the desired meaning of the general formula:

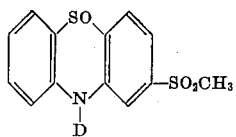

V

This conversion is effected by application of general methods described in the literature for the preparation of N-substituted phenthiazines, for example, by the processes described in British Pat. Nos. 811,959 or 875,845.

The reduction phase of the intermediate product of formula V is carried out by known methods for reducing a sulphoxide to a sulphide, i.e. by the action of hydrogen in a nonreducible solvent such as dimethylformamide. The hydrogen may be molecular hydrogen in the presence of Adams' platinum, or it may be directly produced in the suspension by adding to the latter an acid such as acetic acid and a metal such as zinc. The operation is preferably carried out at elevated temperature, a temperature between 80° and 130° C. generally being suitable.

The isolation of the 9-oxophenthiazine product of formula IV or of formula V obtained from the oxidation phase is generally unnecessary and the product may be treated in solution with hydrogen.

If there has been employed as starting material a 3-methylthiophenthiazine of formula III in which B represents an acyl radical, the oxidation phase has formed a 3-methanesulphonyl-9-oxo-10-acylphenthiazine of formula IV and, if it is desired to obtain the product of formula I in which D represents a hydrogen atom (i.e. 3-methanesulphonylphenthiazine), the 3-methanesulphonyl-9-oxo-10-acylphenthiazine must be subjected to hydrolysis by means of an alkaline agent. It is unnecessary to isolate the oxidation product, and the solution obtained may be directly treated with the hydrolyzing agent in the case where a 3-methylthio-10-acylphenthiazine has been employed as starting material. As hydrolyzing agent, there may be employed a sodium or potassium hydroxide solution, preferably an alcoholic potassium hydroxide solution. The operation is carried out at elevated temperature, preferably at the boiling temperature of the mixture. The hydrolyzing agent is then neutralized to give crude 3-methanesulphonyl-9-oxophenthiazine, m.p. 305°–310° C., which may be purified by conventional methods. This new product is distinguished from 3-methanesulphonylphenthiazine by its infrared spectrum, which has a band at 1,012 cm$^{-1}$.

The 3-methanesulphonyl-9-oxo derivative arising from the oxidation and having optionally undergone hydrolysis, such as 3-methanesulphonyl-9-oxophenthiazine, is suspended in a nonreducible solvent such as dimethylformamide and subjected to the action of hydrogen as hereinbefore stated. The 3-methanesulphonylphenthiazine product is then isolated.

It will be apparent that, in order to obtain the best yield for a particular compound, the solvent employed, the concentration of the oxidizing agent and the reaction temperature must be made such as to follow the general rules previously mentioned. This merely involves conventional adaptations, which are within the ability of persons skilled in the art.

Thus, starting with 3-methylthiophenthiazine, it is preferable to operate in propanol or butanol, to employ as oxidizing agent hydrogen peroxide having a density of 1.10 to 1.15, and to operate at the boiling temperature of the reaction mixture.

Particularly interesting starting materials of formula III are those in which B represents an acyl radical. Such compounds can be prepared by treating 3-methylthiophenthiazine with an acylating agent corresponding to the desired acyl radical. As acylating agent, there is preferably employed an acid anhydride or halide.

The 3-methylthiophenthiazines of formula III wherein B represents an acetyl or benzoyl radical are preferred. The acetyl derivative is preferably prepared by the action of acetic anhydride on 3-methylthiophenthiazine with an excess of acetic anhydride performing the function of solvent. The benzoyl derivative is preferably prepared by the action of benzoyl chloride on 3-methylthiophenthiazine, and the reaction is advantageously effected in a solvent medium, more particularly an aromatic hydrocarbon such as benzene or toluene. In both cases it is advantageous to carry out the acylation at the boiling temperature of the reaction mixture.

By the term "known methods" as used in this specification is meant methods heretofore used or described in the chemical literature.

The following examples illustrate the invention

EXAMPLE 1

A solution composed of 95 percent ethyl alcohol (574 ml.), 3-methylthio-10-acetylphenthiazine (287 g.), and hydrogen peroxide (130 vol; $d$=1.13; 515 ml.=582 g.) is gently boiled for 24 hours. There gradually precipitates a mixture of 3-methanesulphonyl-9-oxophenthiazine and 3-methanesulphonyl-9-oxo-10-acetylphenthiazine, which is separated from its mother solution by filtration at ambient temperature. The product thus isolated is suspended in N/1 alcoholic potassium hydroxide (1.2 l.)

After heating under reflux for 3 hours, the excess of alkali is neutralized with 5N hydrochloric acid until a pH lower than 6.0 is obtained, and the crude 3-methanesulphonyl-9-oxophenthiazine which precipitates is separated by filtration at ambient temperature. It is washed with water and dried in vacuo to give a product (220 g.), which is collected and suspended in a mixture of dimethylformamide (880 g.), acetic acid (405 g.), water (405 g.) and coarse zinc powder (147 g.=2.25 g. at.). The mass is maintained at 95° C. with stirring for 8 hours, filtered at a temperature above 50° C. and the filtrate, after the addition of water (1,620 g.), is cooled to ambient temperature. The crude 3-methanesulphonylphenthiazine is separated by filtration and dried.

The product (197.5 g.) is collected and dissolved in boiling chlorobenzene (790 g.) and filtered at a temperature above 100° C. in order to eliminate the insoluble impurities. On cooling to ambient temperature, purified 3-methanesulphonylphenthiazine (148 g.) crystallizes from this solution. The product obtained has a melting point of 162° C., and an infrared spectrum identical to that of a reference specimen obtained by a different method of synthesis.

3-Methylthio-10-acetylphenthiazine employed as starting material is prepared as follows:

A solution composed of 3-methylthiophenthiazine (245 g.) and acetic anhydride (204 g.) is heated at boiling point for 2 hours. After cooling of the solution to 110° C., the excess of acetic anhydride is hyrolyzed by the addition of distilled water (18 g.). The solution is heated at 110° C. for 1 hour and then cooled to 25° C. It is thereafter diluted once by adding distilled water (40 g.) over a period of 15 minutes. On cessation of the temperature rise due to the precipitation, distilled water (960 g.) is again added over a period of 1 hour with vigorous stirring. After stirring for 2 hours, the crystalline mass is filtered. The crystalline product is washed with water and dried in vacuo to give 3-methylthio-10-acetylphenthiazine (286.5 g. 0.998 mol.; m.p. 100° C.) in a yield of 99.8 percent.

EXAMPLE 2

To a solution composed of 3-methylthio-10-acetylphenthiazine (obtained as described in example 1; 50 g.) and glacial acetic acid (450 ml.) there is added hydrogen peroxide (130 vol.; 52.5 ml.) and then pure sulphuric acid (66° Bé; 15 drops). The mixture is stirred for 7 hours at ambient temperature and water (2,000 ml.) and hydrogen peroxide (130 vol.: $d$=1.13; 38 ml.) are added, and the mixture is left at ambient temperature with stirring for 16 hours.

After reaction for 24 hours, pure sulphuric acid (66° Be; 25 ml.) is added and then, at the end of 30 hours, hydrogen peroxide (60 ml.).

At the end of 70 hours, the precipitate which has gradually appeared is filtered off, washed with water and dried in vacuo to give a product (49.5 g.).

To 43.5 g. of this product, in solution in acetic acid (435 ml.), are added water (435 ml.) and zinc powder (87 g.). The mixture is heated for 15 hours at 80° C. undiluted nitrogen atmosphere. After filtration of the excess of zinc, the mass is diluted with water (2,600 ml.). This causes a gradual precipitation of a product, which is filtered off, washed with water and dried to give 36.5 g. of product.

The product thus obtained (30 g.) is treated for 3 hours under reflux with N/1 alcoholic potassium hydroxide (150 ml.). After cooling and acidification with hydrochloric acid, there is separated by filtration 26.5 of a product, which is impure 3-methanesulphonylphenthiazine. From 20 g. of this product there are obtained by two recrystallizations from chlorobenzene and drying in vacuo 6.8 g. of purified 3-methanesulphonylphenthiazine, m.p. 159° C., the infrared spectrum of which is the same as the reference spectrum of the 3-methanesulphonylphenthiazine obtained by another method of synthesis.

EXAMPLE 3

A solution of anhydrous propanol (717 g.: 920 ml.), 3-methylthio-10-acetylphenthiazine (obtained as described in example 1; 287 g.: 1 mol.) and hydrogen peroxide (130 vol.: $d$=1.13; 388 g.: 343 ml. (4 mol.)) is gently boiled for 18 hours. The mixture of 3-methanesulphonyl-9-oxophenthiazine and 3-methanesulphonyl-9-oxo-10-acetylphenthiazine which precipitates is filtered off between 5° and 10° C. and then treated with N/1 alcoholic potassium hydroxide (1.2 l.). After refluxing for 3 hours, the excess of alkali is neutralized at ambient temperature with 5N hydrochloric acid until a pH between 4 and 5 is obtained. The precipitated 3-methanesulphonyl-9-oxophenthiazine is filtered off and then dried in vacuo.

The product obtained (210 g.), melting at 305°–310° C., is suspended in a mixture of dimethylformamide (840 g.), acetic acid (385 g.: 6.42 mol.), water (385 g.) and coarse zinc powder (140 g.: 2.15 g. at.). The mass is vigorously stirred for 8 hours at 95° C., filtered at a temperature above 50° C. and, after addition of water (1,650 g.), the filtrate is cooled to ambient temperature. The crude 3-methanesulphonylphenthiazine is filtered off and dried in vacuo to give 192.9 g. of dry product. This product is dissolved in boiling chlorobenzene (850 g.). After refluxing for 1 hour, the mass is filtered at a temperature above 110° C. in order to eliminate the insoluble impurities. The filtrate is thereafter cooled to 5° C. and the 3-methanesulphonylphenthiazine which precipitates is filtered off and dried in vacuo to yield purified 3-methanesulphonylphenthiazine (150 g.), m.p. 162° C. Its infrared spectrum is the same as the reference spectrum of 3-methanesulphonylphenthiazine obtained by another method of synthesis.

EXAMPLE 4

A solution composed of ethyl alcohol (880 ml.) and 3-methyl-thio-10-benzoylphenthiazine (349 g.) is heated to boiling point. After the addition over a period of 1 hour of hydrogen peroxide (130 vol.: density 1.13; 447 ml.), the reaction mass is gently boiled for 24 hours. The 3-methanesulphonyl-9-oxo-10-benzoylphenthiazine which precipitates is filtered off between 5° and 10° C. and dried in vacuo. To the product obtained (268 g.) there is added N/1 alcoholic potassium hydroxide (1,200 ml.). After refluxing for 2 hours, the excess of alkali is neutralized at ambient temperature with N/1 hydrochloric acid until a pH between 4 and 5 is obtained. The precipitated 3-methane-sulphonyl-9-oxophenthiazine is filtered off and dried in vacuo.

The product obtained (160 g.) is suspended in a mixture of dimethylformamide (640 ml.), acetic acid (300 g.), water (300 g.) and coarse zinc powder (108 g.). The mass is vigorously stirred for 5 hours at 95° C., filtered at a temperature above 50° C. and, after the addition of water (1,300 g.), the filtrate is cooled to ambient temperature. The crude 3-methanesulphonylphenthiazine is filtered off and then dried in vacuo to give 153 g. of dry product. This product is dissolved in boiling chlorobenzene (560 ml.). After refluxing for 1 hour, the mass is filtered at a temperature above 90° C. in order to eliminate the insoluble impurities. The filtrate is thereafter cooled to 5° C. and the 3-methanesulphonylphenthiazine which precipitates is filtered off and dried in vacuo to yield purified 3-methanesulphonylphenthiazine (93 g.), m.p. 152° C.

3-Methylthio-10-benzoylphenthiazine employed as starting material is prepared as follows:

A solution composed of 3-methylthiophenthiazine (245 g.), benzene (3,500 ml.) and benzoyl chloride (168 g.) is heated at boiling point (82° C.) for 2 hours. The benzene is thereafter distilled at normal pressure until the temperature of the distillation residue reaches 130° C. After cooling, this residue is taken up in distilled water (2,200 ml.) and sodium hydroxide (36° Bé; 200 ml.). The reaction mass is again heated at boiling point for 2 hours. After cooling, the crystalline product is filtered off, washed with water until the washing waters are neutral, and dried in vacuo to constant weight to yield 3-methylthio-10-benzoylphenthiazine (349 g.), m.p. 143° C.

EXAMPLE 5

A solution composed of propanol (1,230 ml.) and 3-methylthiophenthiazine (245 g.) is heated at boiling point.

After the addition over a period of 1 hour of hydrogen peroxide (130 vol.: density 1.13; 447 ml.), the reaction mass is gently boiled for 24 hours. The 3-methanesulphonyl-9-oxophenthiazine which precipitates is filtered off between 5° and 10° C. and then dried in vacuo.

The product obtained (267 g.), m.p. 305°–310° C., is suspended in a mixture of dimethylformamide (670 g.), acetic acid (535 g.), water (176 g.) and coarse zinc powder (176 g.) The mass is vigorously stirred for 5 hours at 95° C., filtered at a temperature above 50° C. and, after the addition of water (1,600 g.), the filtrate is cooled to ambient temperature. The crude 3-methanesulphonylphenthiazine is filtered off and then dried in vacuo to give 259 g. of dry product, which is dissolved in acetone (2,600 ml.). The acetone solution is heated at boiling point for half an hour, filtered at normal temperature in order to eliminate the insoluble impurities and then concentrated to dryness under reduced pressure. After the addition of 2 g. of charcoal, the residue is dissolved at elevated temperature in anisole (650 ml.). The anisole solution is heated at boiling point for half an hour and then filtered at a temperature above 90° C. The filtered solution is there after cooled, and the 3-methanesulphonylphenthiazine which crystallizes is filtered off between 5° and 10° C. and dried in vacuo to yield 3-methanesulphonylphenthiazine (123 g.), m.p. 159° C.

EXAMPLE 6

A solution composed of butanol (1,230 ml.) and 3-methylthiophenthiazine (245 g.) is heated at boiling point. After the addition over a period of 1 hour of hydrogen peroxide (130 vol.: 447 ml.), the reaction mass is gently boiled for 24 hours. The 3-methanesulphonyl-9-oxophenthiazine which precipitates is filtered off between 5° and 10° C. and dried in vacuo.

The product obtained (275 g.) is suspended in a mixture of dimethylformamide (1,100 g.), acetic acid (506 g.), water (506 g.) and coarse zinc powder (185 g.). The mass is vigorously stirred for 5 hours at 95° C., filtered at a temperature above 50° C. and, after the addition of water (2,150 ml.), the filtrate is cooled to ambient temperature. The crude 3-methanesulphonylphenthiazine is filtered off and then dried in vacuo to give 251 g. of dry product, which is dissolved in boiling toluene (1,570 ml.). After refluxing for 1 hour, the mass is filtered at a temperature above 90° C. in order to eliminate the insoluble impurities. The filtrate is thereafter cooled to 5° C., and the 3-methanesulphonylphenthiazine which precipitates is filtered off and dried in vacuo to yield purified 3-methanesulphonylphenthiazine (134.5 g.), m.p. 159°–160° C.

EXAMPLE 7

3-Methanesulphonyl-9-oxophenthiazine is prepared as described in example 1 and the following procedure is carried out:

A solution composed of acetone (1,900 ml.), 3-methanesulphonyl-9-oxophenthiazine (293.4 g.), ground potassium hydroxide (126 g.) and 1-chloro-3-bromopropane 630 g.) is heated at boiling point for 2½ hours. The mineral salts are thereafter filtered off at 20° C. and the filtrate is concentrated to dryness under normal pressure and then reduced pressure (5mm. Hg). The residue is dissolved with heating in butanol (1,360 ml.). After the addition of decolorizing charcoal (2g.), the solution is heated at boiling point for half an hour, and then filtered at a temperature above 90° C. in order to eliminate the insoluble impurities. After cooling, 3-methanesulphonyl-9-oxo-10-(3-chloropropyl)phenthiazine which precipitates is filtered off and dried in vacuo to give a dry product (270 g.; yield 73.2 percent), melting point (Köfler) 166°–169° C.

This product is suspended in a mixture of anisole (2,930 ml.), isonipectoamide (107.8 g.) and potassium carbonate (100.8 g.). The reaction mass is heated at 115°–120° C. for 24 hours and then cooled to ambient temperature. The reaction products are filtered off and stirred for 1 hour with water (3,660 ml.). After filtration, a further washing is carried out with water (1,830 ml.).

The resultant 3-methanesulphonyl-9-oxo-10-[3-(4-carbamoylpiperidino)propyl]phenthiazine is filtered off and, after drying in vacuo 258.4 g. of dry product (yield 76.5 percent, melting point (Köfler) about 210° C. (not very distinct), is obtained.

This product is suspensed in a mixture of dimethylformamide (1,033 g.), acetic acid (300 g.), water (100 g.) and coarse zinc powder (110.4 g.). The reaction mass is heated at 95° C. for 5 hours. The remaining zinc is filtered off at a temperature above 60° C., and the filtrate is cooled to ambient temperature.

After the addition of sodium hydroxide (36° Bé; 1,000 ml.) and water (2,065 ml.), the 3-methanesulphonyl-10-[3-(4-carbomoylpiperidino)-propyl]phenthiazine is filtered off and dried in vacuo to give a dry product (288 g.).

The crude product obtained is dissolved in boiling anisole (2,575 ml.) and, after the addition of decolorizing charcoal (2 g., the anisole solution is heated at boiling point for 30 minutes. It is then filtered at a temperature above 90° C. and the filtrate is cooled to ambient temperature. The purified product is filtered at 20°–25° C. and then dried in vacuo to yield purified 3-methanesulphonyl-10-[3-(4-carbamoylpiperidino)propyl]phenthiazine (210 g.), melting point 187°–188° C.

EXAMPLE 8

3-methylthio-10-(3-dimethylamino-2 methyl propyl)-10 phenthiazine hydrochloride, (4.75 g.) ethyl alcohol (96 percent; 10 ml.) are mixed and heated at 50° C. Hydrogen peroxide (130 vol.; density 1,13; 5.2 ml.) is slowly added. The mixture is kept at 50° C. during 17 hours. The ethyl alcohol is then distillated to dryness. A viscous mass is obtained and then dissolved into acetic acid (4ml.)

Dimethylformamide (16 ml.) coarse zinc powder (3g.) are added. The mixture is allowed to stand until the temperature rise is practically stopped. Then acetic acid (10 ml.), water (8 ml.) are added. The mixture is heated and kept at 95° C., the zinc powder disappears within 5 hours. The mixture is cooled, water (50 ml.) and aqueous sodium hydroxyde solution (36° Bé; 50 ml.) are added. The mixture is extracted with diethylether, the ethereal layer separated and evaporated to dryness. The solid product is then recrystallized into a mixture (50/50 vol.) of petroleum ether (fraction 50°–60° C) and diethyl ether.

A solid product (2,1 g.) melting at 120° C. is obtained containing 25 percent 3-methanesulfonyl 10-(3-dimethylamine-2 methyl propyl)-10 phenthiazine.

By repeating the same operation, but using a temperature of 70° C. for reacting hydrogen peroxide a product (4 g.) melting at 125° is obtained which contains 80 percent 3-methanesulfonyl 10-(dimethylamino-3-methyl-2propyl) phenthiazine.

EXAMPLE 9

Using 3-methylthio 10-[(N-methylpiperidyl-2)-2-ethyl]phenthiazine hydrochloride (5 g.) and operating as described in example 8, using a temperature of 65° C. for reacting hydrogen peroxide a product (4 g.) is obtained containing 70 percent 3-methanelfonyl 10-[(N-methyl-piperidyl-2)-2 ethyl]phenthiazine.

We claim:

1. Process for the preparation of a 3-methanesulphonylphenthiazine of the formula:

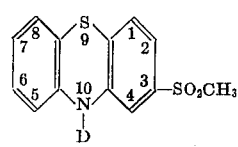

I wherein D is hydrogen, an acyl radical derived from an aliphatic acid containing one to four carbon atoms or a cycloalkanoic acid containing up to nine carbon atoms or a radical AX wherein A is a straight- or branched-chain aliphatic hydrocarbon radical containing two to five carbon atoms and X is a di-loweralkylamino, pyrrolidino, piperidino, morpholino or 4-alkylpiperazino radical or a radical of formula:

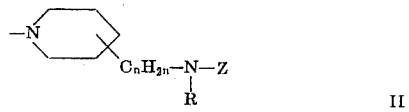

II wherein $n$ equals 0, 1 or 2, R is hydrogen or a lower alkyl radical and Z is a lower acyl radical, lower alkoxycarbonyl, lower alkanesulphonyl, carbamyl or sulfamoyl radical; which comprises oxidizing a 3-methylthiophenthiazine of the formula:

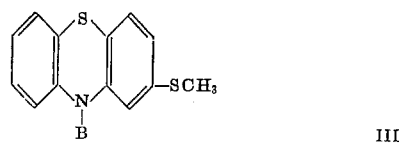

III wherein B is hydrogen or any one of the radicals set out in the definition of D above, with hydrogen peroxide at a temperature between ambient temperature and the boiling point of the reaction mixture for a time sufficient to produce a 3-methanesulphonyl-9-oxophenthiazine of the formula:

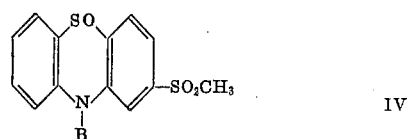

IV but insufficient to produce substantial quantities of the 9,9-dioxophenthiazine, and reducing the resulting 3-methanesulphonyl-9-oxophenthiazine by hydrogenation.

2. A process according to claim 1 wherein B is an acyl radical and, after the treatment with hydrogen peroxide but before hydrogenation, the 3-methanesulphonyl-9-oxophenthiazine is subjected to alkaline hydrolysis to produce the corresponding 10-unsubstituted compound.

3. Process according to claim 1 in which the oxidation of the 3-methylthiophenthiazine is carried out in an organic solvent which is inert under the reaction conditions employed with an oxidizing agent which is soluble in the solvent employed.

4. Process according to claim 3 in which the organic solvent is an alcohol or an organic acid.

5. Process according to claim 2 in which the organic solvent is methanol, ethanol, propanol, butanol or acetic acid.

6. Process according to claim 1 in which the hydrogen peroxide used is an aqueous solution having a density of 1.1 to 1.3.

7. Process according to claim 1 in which from 1.1 to 5 times the theoretically necessary quantity of hydrogen peroxide employed in order to obtain the 3-methanesulphonyl-9-oxophenthiazine of formula III.

8. Process according to claim 7 in which from 1.3 to 2 times the theoretically necessary quantity of hydrogen peroxide is employed.

9. Process according to claim 3 in which the reaction mixture for the oxidation phase contains a small quantity of a strong inorganic acid.

10. Process according to claim 1 in which reduction is effected in a nonreducible solvent.

11. Process according to claim 10 in which the nonreducible solvent is dimethylformamide.

12. Process according to claim 10 in which reduction is carried out with molecular hydrogen in the presence of Adams' platinum, or with hydrogen liberated by the action of an acid on a metal.

13. Process according to claim 12 in which reduction is carried out with hydrogen liberated by the action of acetic acid on zinc.

14. Process according to claim 1 wherein symbol B in the 3-methylthiophenthiazine starting material represents a hydrogen atom or an acyl radical containing one to four carbon atoms.

15. Process according to claim 2 wherein the acyl radical B is acetyl or benzoyl.

* * * * *